United States Patent [19]

Beattie et al.

[11] Patent Number: 4,872,208

[45] Date of Patent: Oct. 3, 1989

[54] COMPACT MONOPOLE DIGITAL TACHOMETER GENERATOR FOR USE IN AIRBORNE VEHICLES

[75] Inventors: Steven K. Beattie, North Hollywood; Paul C. Richards, Simi Valley; David A. Smith, Canoga Park, all of Calif.

[73] Assignee: Ontic Engineering and Manufacturing Inc., North Hollywood, Calif.

[21] Appl. No.: 249,865

[22] Filed: Sep. 27, 1988

[51] Int. Cl.$^4$ .................... G01P 3/48; G01P 3/54; G01B 7/14

[52] U.S. Cl. .................... 324/174; 324/208

[58] Field of Search ............... 324/173, 174, 207, 208; 310/155, 168, 121; 73/518, 519, 520, 432; 361/240, 392

[56] References Cited

U.S. PATENT DOCUMENTS

| | | | |
|---|---|---|---|
| 2,630,529 | 3/1953 | Mann et al. | 250/27 |
| 3,317,829 | 5/1967 | Kuhrt et al. | 324/208 |
| 3,458,741 | 7/1969 | Woodward | 324/174 |
| 3,938,112 | 2/1976 | Gee | 340/195 |
| 4,279,576 | 7/1981 | Okano et al. | 417/407 |
| 4,358,735 | 11/1982 | Boys | 324/208 |
| 4,370,614 | 1/1983 | Kawada et al. | 324/173 |
| 4,447,517 | 5/1984 | Yuge et al. | 430/122 |
| 4,725,777 | 2/1988 | Tousch | 324/208 |

Primary Examiner—Reinhard J. Eisenzopf
Assistant Examiner—Walter E. Snow
Attorney, Agent, or Firm—Merchant, Gould, Smith Edell, Welter & Schmidt

[57] ABSTRACT

A motion detection device such as a tachometer generator (10), is disclosed for the detection of the rotation of a body or shaft around an axis. The generator (10) includes a perforated disc (15) mounted on a shaft (8), and a sensing device (24) including a coil (25) and magnet (21) mounted in close proximity to the perforated disc (15). The disc (15) is made of a ferrous material. When rotated, the alternating holes (16,17) and webs (18) in the disc (15) produce an alternating current in the sensor (24), the frequency of which is proportional to the rotational speed of the disc. Any number of sensors (24) may be used and the disc (15) may have any number of holes (16,17). The signal developed by each or any sensor (24) is transmitted by wires (1,2) to a suitable indicating or recording device.

13 Claims, 4 Drawing Sheets

COMPACT MONOPOLE DIGITAL TACHOMETER GENERATOR FOR USE IN AIRBORNE VEHICLES

BACKGROUND OF THE INVENTION

This invention relates to systems for generating signals corresponding to the rotation of a shaft, disc, or other member, and more particularly to tachometer generators for attachment to primary power sources, which tachometer generators provide one or more proportional varying frequency signals without requiring external power.

Modern control and data processing systems include a wide range of velocity responsive signal generators used for timing, indication, or control functions. A particularly difficult problem is presented by tachometer generators that are required to be used with airborne vehicles, such as helicopters, because established standards permit only limited volumetric and weight values, while also requiring that a variable frequency A.C. signal be provided that is proportional to the rotation rate, and of sufficient power output to drive panel indicators without intervening amplifiers, so that maximum reliability can be achieved. The assignee of the present application has previously manufactured tachometer generators using a magnetic transducer sensing the passage of peripheral teeth on a magnetic wheel. While satisfactory for prior applications, more recent, stringent requirements have required that the tachometer generator be capable of confinement, within increasingly smaller volumes, and that up to four output signals be provided passively, each having significant individual power output levels. Such requirements could not be met by previous devices, in part because of mechanical considerations, but also because of space requirements. It is desirable, in these systems, to have a complete unit supported on a mounting pad on the prime mover housing, and while the unit must be rugged it must also fit within a cube of less than 3" on a side, thereby dictating that size and weight being minimized to the extent possible. It is also necessary for some applications to have more than one transducer generating an output signal and, for purposes of redundancy and safety, the transducer should be passive, requiring no external excitation, and function independently of any companion transducers. Also, the device must provide sufficient power to directly actuate panel indicators for the pilots of the vehicle.

In drum and disk memories, for example, it has long been known to use a track of magnetized spots or a recorded timing pattern, to provide clock signals for use in controlling the recording, reproduction and transfer of data. Variants of these systems for other applications have used toothed wheels whose inductive or magnetic coupling causes a change in signal which can be used to indicate the rotational velocity of a rotating member, and from this signal a digitally clocked or varying frequency A.C. signal can be generated. Such devices typically produce an output voltage of 7 or 8 volts at engine speeds of 4500 Rpm.

In addition to the sensing of peripheral teeth on a wheel, there are a number of speed indicators and tachometer generators that utilize disks or rotors with spaced apart apertures, and which sense passage of the apertures to generate a signal representative of rotational velocity. Illustrative of such patents is U.S. Pat. No. 2,630,529, which discloses an electrically conductive rotor with radially spaced apertures. At least two coils spaced on opposite sides of the disc are components of an oscillator circuit which can operate only when the aperture position permits coupling between the opposed coils. Thus, the output of the device is a series of constant frequency pulses which are proportional to disc rotation speed. This device does not lend itself to compact, independent operation since it requires sensing elements on each side of the rotating disc, and a power supply, along with a host of active circuit components, to operate the required oscillator. Any single power or component failure renders to device inoperative. Other representative patents include U.S. Pat. Nos. 3,938,112, 4,279,576, 4,370,614, 4,358,735, 4,447,517, and 4,775,777. These units, however, are also either excessively complex in requiring more than one sensor element to generate a signal, or require an external source of power, or generate some other signal than an A.C. signal whose frequency is proportional to rotational velocity.

SUMMARY OF THE INVENTION

A tachometer generator in accordance with the invention incorporates a driven shaft, rotatable about a rotatable axis, that extends through a mounting pad to be driven by an accessible member on a drive system at a rate proportional to the speed of the drive system. The shaft supports a disk, concentric with the axis of rotation of the shaft that is of a magnetizable material and of substantial thickness. The disk incorporates, at a given radius, a number of equally spaced circular holes separated by webs of finite thickness. Adjacent the circular holes in the disk are the pole faces of adjacent magnetic transducers, the pole faces spanning a selected area relative to the size of the apertures. Permanent magnets in the transducers provide a fringing flux at the pole tips which is intercepted by the adjacent disk magnetic material, a non-magnetic shield about the transducer controls the flux path, and a helical coil intercepts the lines of flux to generate a current depending upon the rate of changes in the fringing field, dependent upon the changes in flux density that occur as the disk rotates. The body of the transducer is parallel to the axis of rotation and encompasses only a portion of the periphery of the disk. Accordingly, additional transducers may be placed at the same radial position in different sectors of the disk, even though the disk is very small (of the order of 1½" maximum diameter). The disk has substantial thickness in the direction parallel to the axis of rotation, so that the reluctance of the magnetic path adjacent to the pole tip changes depending upon the area of solid disk material opposed to the pole tip area, the relationship being such that a closely sinusoidal waveform is generated at all rotational velocities, and the signal for the rotational rates of interest is of sufficiently great power to drive "percent of cruise" indicators in the control center or cockpit of the aircraft. With this arrangement, as many as four transducers can be employed within a housing having an overall dimension of less than 2.5"×3.25"×3.25", each transducer generating a signal having an adequate power level, passively generated, to drive a separate indicator.

BRIEF DESCRIPTION OF THE DRAWINGS

A better understanding of the invention may be had by reference to the following description taken in conjunction with the accompanying drawings, in which.

DETAILED DESCRIPTION OF THE INVENTION

Figure 1:
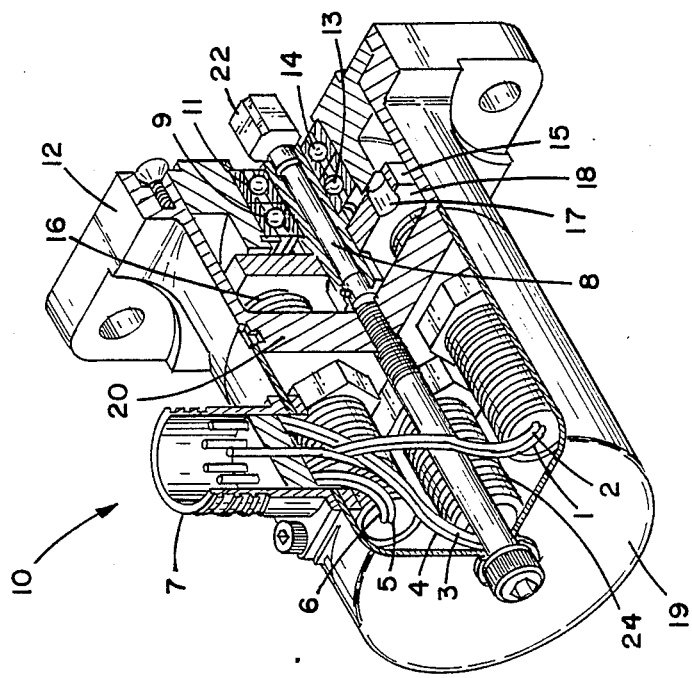
FIG. 1 is a perspective view, partially broken away, of a tachometer generator in accordance with the invention for mounting on the exterior of a helicopter engine.
Figure 2:
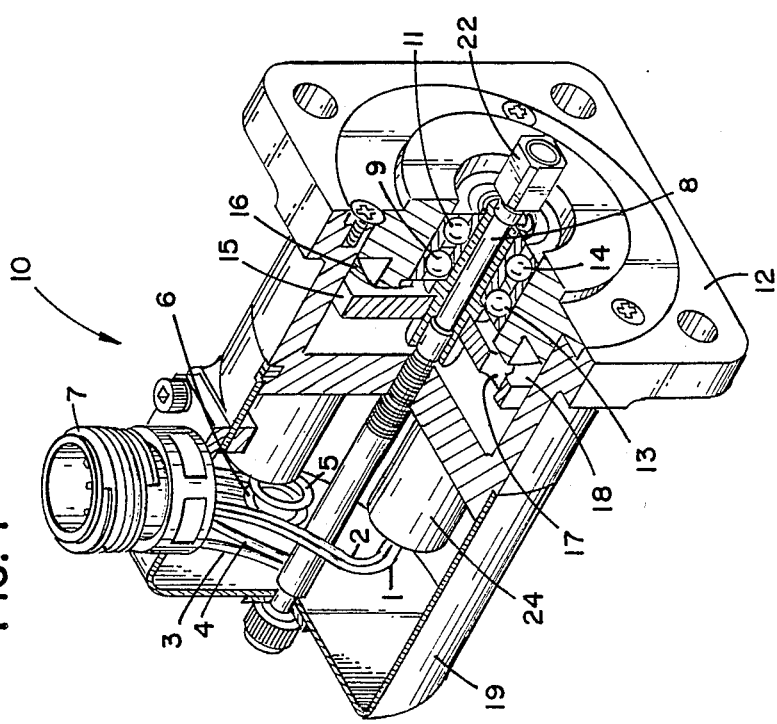
FIG. 2 is a second, broken away, perspective view of the tachometer generator of FIG. 1, showing details thereof.
Figure 3:
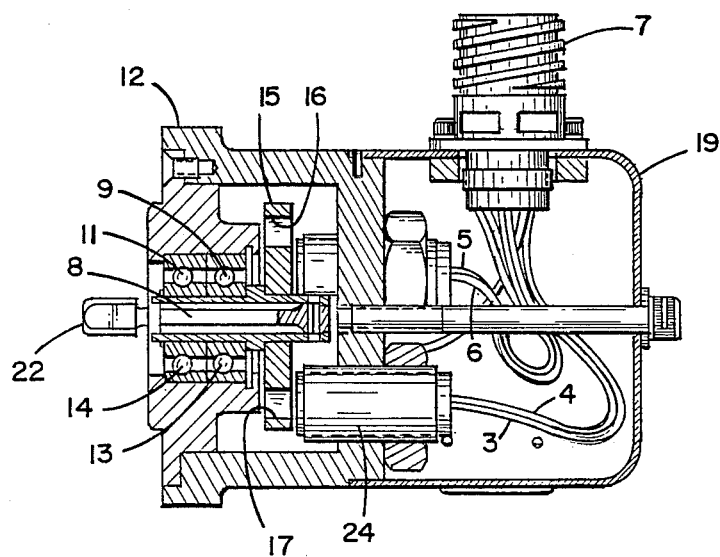
FIG. 3 is a cross-sectional view of the tachometer generator of FIGS. 1 and 2.
Figure 4:
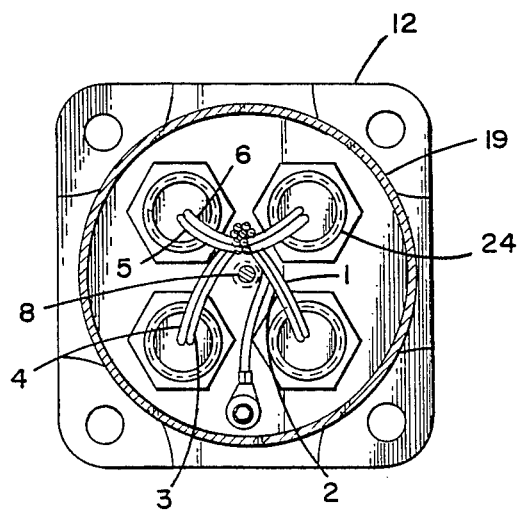
FIG. 4 is an end view, of the tachometer generator of FIGS. 1-3.

A tachometer generator 10 in accordance with the invention is a small, rugged unit, having a base or mounting flange 12 for mounting on a pad (not shown) on an engine (not shown), typically an upstanding helicopter engine. An accessible fitting (not shown) extending through the mounting pad on the engine is engageable by a shaft head 22 extending through the mounting flange 12 on the tachometer generator 10. Signal leads 1, 2, 3, 4, 5 and 6 exit the tachometer generator 10 at plug 7 so as to couple electrical signals generated therein to appropriate cockpit indicators (not shown) of which as many as four may be used.

Within the tachometer generator, the drive shaft 8 that is coupled to the accessible fitting on the helicopter engine is supported on ball bearings 9, 11, 13, and 14 which, in turn, support a transversely mounted disk 15, constructed of a magnetic material and having substantial thickness, the disk in the preferred embodiment being approximately 1.50" in diameter and 0.187" thick. The disk 15 is mounted concentrically with the axis of rotation of the drive shaft 8. The disk 15 further includes, at a predetermined radius from the axis of rotation, a number of equally spaced circular holes, for example, holes 16 and 17 (and others not shown) extending through the disk 15, with the holes being separated by webs 18 of substantial width. The holes 16 and 17 may be of any shape, such as a rectangle or an ellipse. In the preferred embodiment the center of each hole 16, 17 is at a radial spacing of 0.585", and is formed as a circular orifice having a diameter of 0.203".

Figure 7:
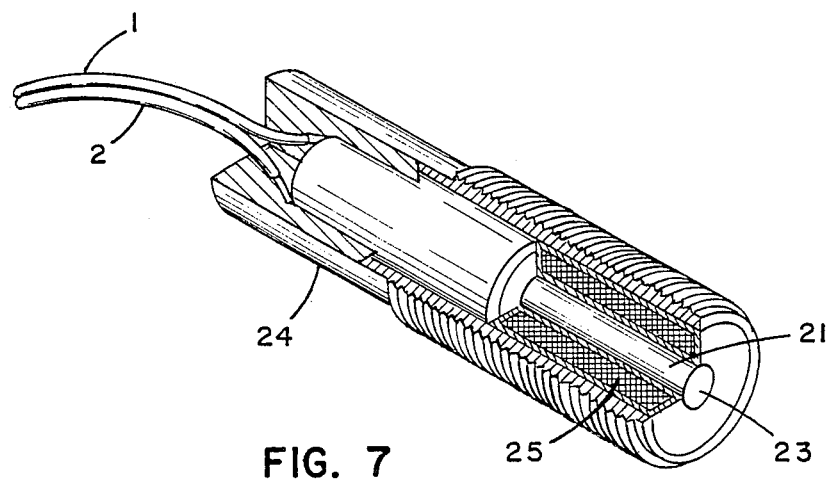
FIG. 7 is a perspective view, partially broken away, of the transducer unit used within the tachometer generator as shown in FIG. 1.

The tachometer generator 10 includes an exterior housing 19 which is partitioned by a transverse divider 20 adjacent the disk 15. The divider 20 is separated from the disk 15 by a distance of approximately 0.01". The divider 20 is mounted, in this example, so as to support the signal transducers. As best seen in FIG. 7, the transducers each comprise a central permanent magnet structure 21 of cylindrical form residing parallel to the axis of rotation (thereby paralleling the longitudinal axis of drive shaft 8) and having a substantially circular pole face 23 of substantial area opposed to and spaced apart from the disk 15 at a radius equal to the radial spacing of the holes 16, 17. In the preferred embodiment, the pole face 23 has a diameter of 0.125 inch, and the magnet 21 has a length of 0.625 inch. Each transducer also includes a nonmagnetic sleeve 24 about the cylinder 21, and a sensing coil 25 disposed adjacent the pole tip 23, and responsive to flux variations in the fringing flux generated by the permanent magnet. The sensing coil 25 is coupled to external leads 1, 2 which are electrically connected to the indicator in the cockpit.

Figure 5:
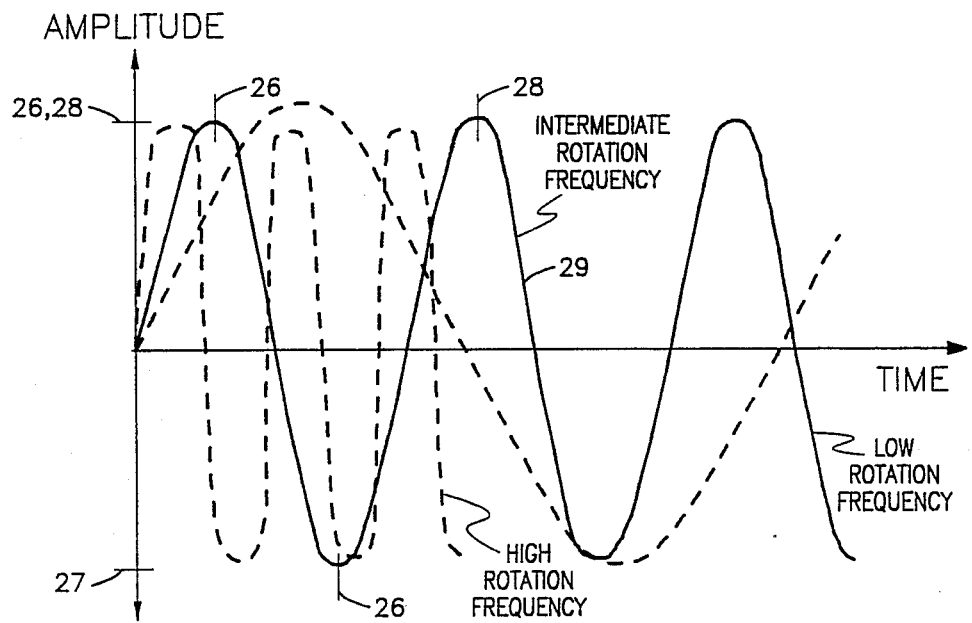
FIG. 5 is a graphical representation of voltage vs. time, showing typical signals generated at different rotational velocities in operation of the device.

As the engine crankshaft rotates, therefore, the accessible fitting turns the drive shaft 8 of the tachometer generator 10 at a rotational rate which is proportional to the rate of crankshaft rotation, so that the frequency of the signal generated by the tachometer generator 10 can be employed to operate the indicator in the cockpit. Rotation of the disk 15 changes the reluctance encountered in the magnetic field established by the permanent magnet 21, the reluctance varying in proportion to the amount of the of magnetic disk material are that is immediately opposite the large area pole tip 23. As best seen in FIG. 5, the maximum number 26 of magnetic field lines intercepted by the coil 25 occurs when the pole tip 23 is directly opposite the web portion 18 of the disk 15, and thereafter decreases to zero in sinusoidal fashion 29 and goes to a negative limit 27 when the pole face is directly aligned with a hole (such as hole 16 or 17), thereafter beginning to increase in a sinusoidal fashion, passing through zero with a positive slope and reaching a maximum value 28 at the next web 18. Using this arrangement, (or what may actually be actually the reverse of what has just been described depending upon the design of the transducer) and having sufficient thickness of magnetic material to close the flux path, the variation is truly sinusoidal and no wave shaping is required. As seen in FIG. 5, the amplitude of the signal generated varies in accordance with the speed of rotation, since the rate of flux change is faster at higher rotation rates, but remains sinusoidal in each instance, and corresponds in frequency to the rate of rotation.

Figure 8:
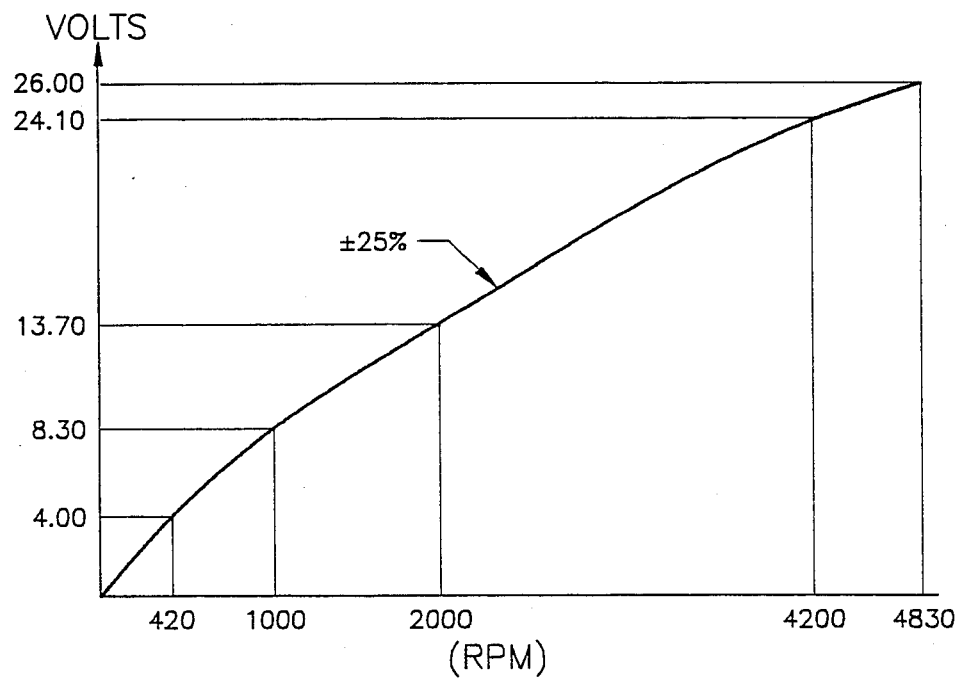
FIG. 8 is a graph depicting the output voltage as a function of revolutions per minute for the tachometer generator as depicted in FIG. 1.
Figure 6:
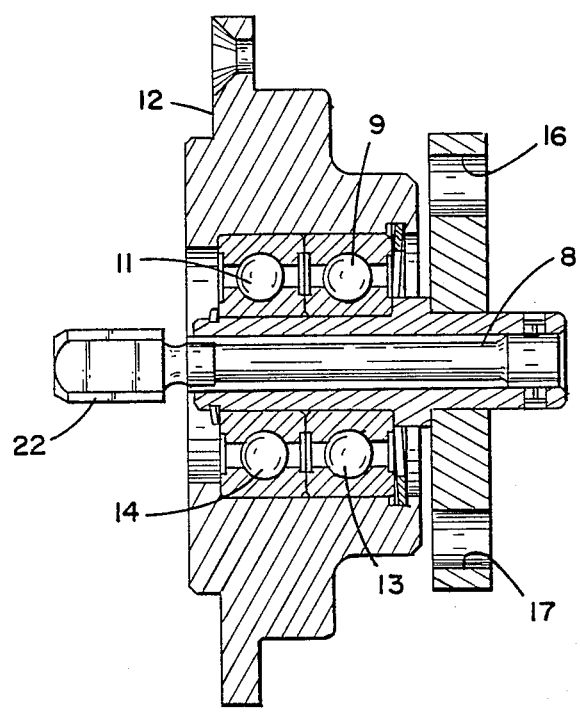
FIG. 6 is an enlarged cross sectional view of a portion of the tachometer generator as depicted in FIG. 3.

As shown in FIG. 8, the transducer output is approximately 25 volts for an engine speed of 4500 Rpm, almost three times that of prior devices. The signal produced from the transducer is more than adequate for driving an indicator directly. Failure of the electrical power source or failure of a portion of the system, such as one of the transducers or the indicators, has no effect on the other independently operated systems represented by the alternate transducers within tachometer generator. This passive operation, in a rugged unit that requires no external power and can withstand substantial shock and vibration, provides the needed level of safety and reliability for aircraft operation.

I claim:

1. A motion detecting device comprising:
   a. a rotating member, the rotating member comprising a planar disk, the disk being rotatable about an axis perpendicular to the plane of the disk, the disk being perforated by a least one aperture, the disk being composed of a substantially ferrous material, the rotating member having ferrous regions and nonferrous regions;
   b. a magnet, the magnet generating a magnetic field characterized by lines of flux, the lines of flux intercepting the rotating member;
   c. a flux density sensor, the flux density sensor detecting rates of change of flux density caused by magnetic field variations as the magnetic field alternately encounters the ferrous and nonferrous regions of the rotating member;

d. a frequency indicator, the frequency indicator detecting periods of rates of change in flux density as sensed by the field density sensor, the periods of the rate of change corresponding to the frequency of rotation of the rotating member;

e. a shaft, the shaft being affixed to the disk so as to be concentric with the axis about which the disk rotates, the shaft being coupled to a parent device, the shaft thereby imparting the motion of the parent device to the plane disk; and f. a housing, the housing comprising:
i. a mounting flange, the mounting flange being adapted to mate with a compatible fixture on the parent device;
ii. a cylindrical body; and
iii. a partition, the partition being integrally formed within the cylinder, the partition dividing the cylindrical body into a first portion and a second portion, the disk residing within the first portion, the flux density sensor and the magnet residing within the second portion.

2. The motion detector of claim 1, wherein the magnet is formed as a cylinder, the cylinder having a first end and a second end, the first end corresponding to a first pole of the magnet, the second end corresponding to a second opposite pole of the magnet, the lines of flux passing from the first pole of the magnet to the opposite pole of the magnet.

3. The motion detector of claim 2, wherein the cylindrical magnet is affixed to the partition such that the cylinder is parallel to the shaft, the partition having an aperture so as to permit the lines of flux to be in electro magnetic communication with the disk.

4. The motion detector of claim 3, wherein the flux density sensor comprises an electrically conductive coil, the coil substantially surrounding the cylindrical magnet so as to intercept the lines of flux, any variation in the lines of flux tending to induce an electric current flow within the coil.

5. The motion detector of claim 4, wherein a plurality of cylindrical magnets and coils are affixed to the partition, each magnet and coil being paired so as to form a transducer, each transducer generating a sinusoidal electric current in response to variations in the flux density, said variations be caused by the interception of the lines of flux by the planar disk, the planar disk rotating in response to the motion of the parent device.

6. The motion detector of claim 5, wherein the planar disk is perforated by a plurality of apertures, each aperture being equally spaced circumferentially and radially about the disk, the plane of the disk being parallel to the partition, the apertures being so spaced so as to pass concentrically by the first pole of each cylindrical magnet, thereby causing a sinusoidal variation in the electric current induced in the transducer coil.

7. The motion detector of claim 6 wherein the planar disk is less than two inches in diameter, and less than one half inch in thickness.

8. The motion detector of claim 7, wherein the shaft is supported within the housing by ball bearings.

9. The motion detector of claim 8, wherein the planar disk is separated from the partition by a distance of less than one fourth of an inch.

10. The motion detector of claim 9, wherein the current induced within the transducer coil is sufficient to directly excite the frequency indicator.

11. The motion detector of claim 10, wherein each transducer operates independently, thereby being unaffected by a failure in another transducer.

12. The motion detector of claim 11, wherein the frequency of the sinusoidal electric current induced within the transducer is proportional to the rate of rotation of the planar disk, the rate of rotation of the planar disk being proportional to the motion of the parent machine.

13. The motion detector of claim 12, wherein the motion detector may be operated in any orientation with respect to a horizontal plane.

* * * * *